United States Patent
Shuck

(10) Patent No.: US 7,260,559 B1
(45) Date of Patent: Aug. 21, 2007

(54) METHOD FOR SIMULTANEOUSLY IMPROVING EDUCATIONAL, ECONOMIC, ECOLOGICAL, ENVIRONMENTAL, AND OTHER PROCESSES VITAL TO COMMUNITIES

(76) Inventor: L. Zane Shuck, 401 Highview Pl., Morgantown, WV (US) 26505

( * ) Notice: Subject to any disclaimer, the term of this patent is extended or adjusted under 35 U.S.C. 154(b) by 508 days.

(21) Appl. No.: 10/373,910

(22) Filed: Feb. 25, 2003

Related U.S. Application Data

(60) Provisional application No. 60/360,846, filed on Mar. 1, 2002.

(51) Int. Cl.
*G06F 17/00* (2006.01)
*G06N 5/00* (2006.01)

(52) U.S. Cl. ...................................................... 706/45

(58) Field of Classification Search ................. 706/59, 706/45, 46, 919, 925, 927, 930, 934, 49; 705/1, 10, 500, 7
See application file for complete search history.

(56) References Cited

U.S. PATENT DOCUMENTS

| | | | | |
|---|---|---|---|---|
| 5,808,916 | A | * | 9/1998 | Orr et al. .......................... 703/6 |
| 5,818,737 | A | * | 10/1998 | Orr et al. .......................... 703/6 |
| 5,991,741 | A | * | 11/1999 | Speakman et al. ............. 705/30 |
| 6,064,971 | A | * | 5/2000 | Hartnett .......................... 706/46 |
| 6,317,700 | B1 | * | 11/2001 | Bagne .......................... 702/181 |
| 6,490,573 | B1 | * | 12/2002 | Njemanze ...................... 706/19 |
| 6,735,490 | B2 | * | 5/2004 | Anand et al. .................. 700/97 |
| 2002/0188554 | A1 | * | 12/2002 | Holbrook ....................... 705/37 |
| 2002/0198734 | A1 | * | 12/2002 | Greene et al. .................. 705/1 |
| 2003/0004925 | A1 | * | 1/2003 | Knoblock et al. .............. 707/1 |
| 2003/0014342 | A1 | * | 1/2003 | Vande Pol ..................... 705/36 |
| 2003/0074163 | A1 | * | 4/2003 | Anand et al. .................. 703/1 |
| 2004/0006566 | A1 | * | 1/2004 | Taylor et al. ................ 707/100 |
| 2004/0015376 | A1 | * | 1/2004 | Zhu et al. ....................... 705/7 |

OTHER PUBLICATIONS

Shuck, L.Z., "Appalachian Rivers III Conference and Exhibit: Opening Remarks", NETL Publications, Conference Proceedings the Appalachian Rivers III Conference, Oct. 2000.*

Hahn, K.L., "Developing a Picture of Electronic Publishing: A Qualitative Study of the Ecology Community", Proceedings of the Socioeconomic Dimensions of Electronic Publishing Workshop, Apr. 1998.*

Mikesell et al., "Exploring the Behavior of the Spring Ecosystem Model Using an Object-Oriented Database System", Proceedings of the 13th International Conference on Scientific and Statistical Database Management, Jul.2001.*

(Continued)

*Primary Examiner*—Anthony Knight
*Assistant Examiner*—Michael B. Holmes
(74) *Attorney, Agent, or Firm*—Steptoe & Johnson PLLC

(57) ABSTRACT

A method serving as a catalyst and tool for improving the fundamental processes vital to a community by applying a quantitative, interlaced, simultaneous, multi-disciplinary, systems engineering approach to improve and maximize achievement of goals and processes occurring within a city or greater extended community, such as, a large watershed area. The method involves a specifically designed facility, a computer-based mathematical model, and an exemplary methodology for public participation based on the mathematical relationship and interdependencies of the educational activity, economic development, ecological preservation, environmental issues, research activity, and entertainment and recreation activity of the community.

4 Claims, 1 Drawing Sheet

OTHER PUBLICATIONS

Figure 1:
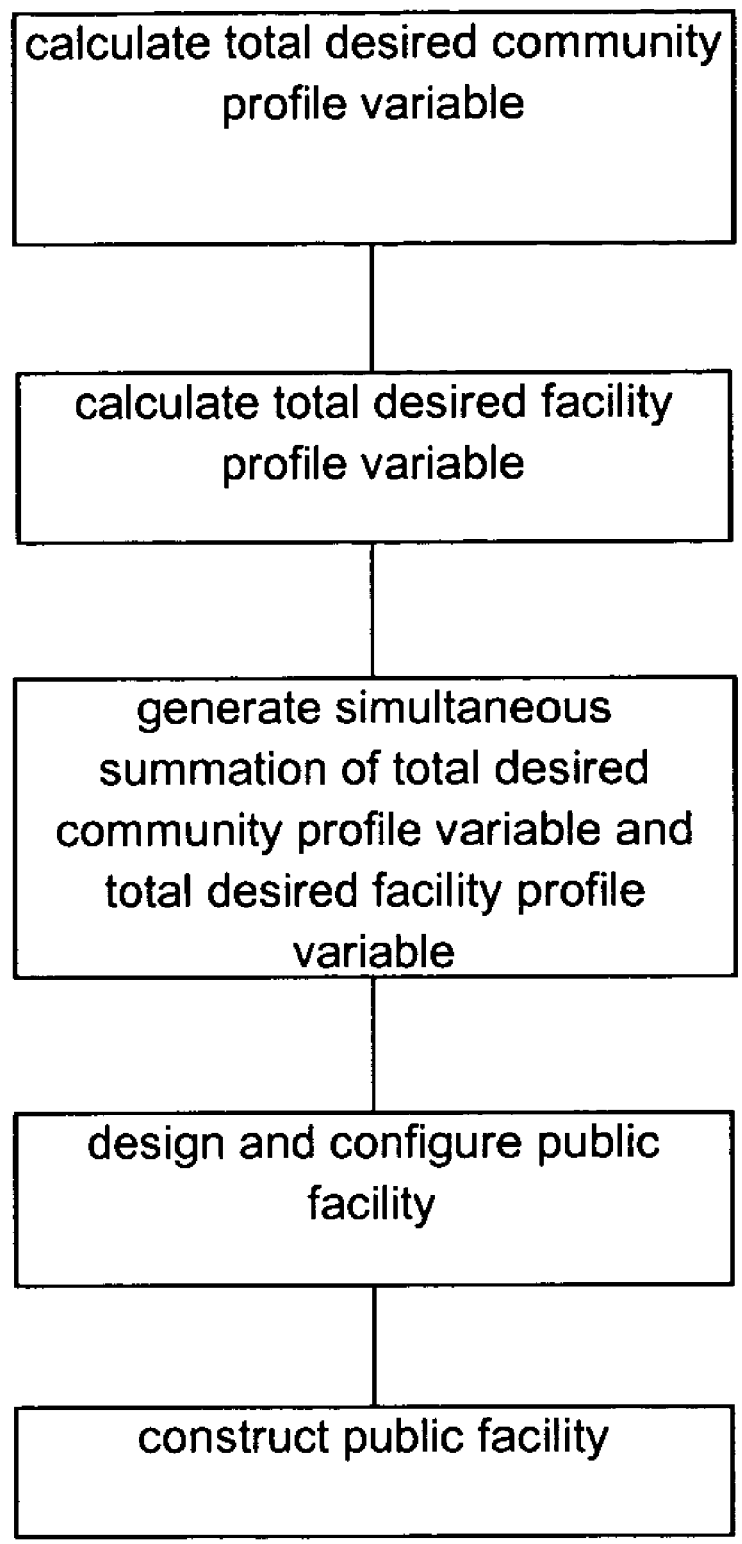

Bruegge, "Developing GEMS: An Environmental Modeling System", IEEE Computational Science and Engineering, Fall 1995.*

Watkins, "Introduction to Cost Benefit Analysis", San Jose State University Economics Department, Retrieved from the Interne http://www2.sjsu.edu/faculty/watkins/cba.htm.*

Friedman, "The Semiotics of SimCity", 1999, Retrieved from the Internet, http://www.firstmonday.dk/issues/issue4_4/friedman.*

Jeffers, "Practitioners Handbook on The Modelling of Dynamic Change in Ecosystems", SCOPE, 1988.*

Hopkins, "SimCity Info", Retrieved from the Internet, http://www.art.net/~hopkins/Don/simcity/index.html.*

* cited by examiner

METHOD FOR SIMULTANEOUSLY IMPROVING EDUCATIONAL, ECONOMIC, ECOLOGICAL, ENVIRONMENTAL, AND OTHER PROCESSES VITAL TO COMMUNITIES

CROSS-REFERENCE TO RELATED APPLICATIONS

This application claims priority from U.S. provisional application No. 60/360,846, filed on Mar. 1, 2002.

BACKGROUND OF THE INVENTION

1. Field of the Invention

This invention relates to the design and development of communities, and in particular, to an analytical method for designing a community facility that improves the educational, environmental, ecological, and economic aspects of a community.

2. Related Art

Communities throughout the United States, and especially in Appalachia, are under unprecedented levels of stress of many types of both internal and external origin and causes. Many of the cities and communities were founded along streams and rivers because of water transportation and natural resources availability. Today, many of those reasons have disappeared and the rivers are so severely polluted they are looked upon negatively as a liability rather than an asset. However, they still have huge undeveloped potential. Therefore there is a need for a method that helps: restore river cities and communities; mitigate environmental problems; restore rivers; and improve the use of rivers as a valuable resource.

The issues or principal controlling variables effecting the improvement of a community are interdependent and must be appropriately considered as described below:

Educational systems are increasingly burdened by constraints in discipline, homework assignments, competing time for sports, teacher availability and qualifications, legal, security, and many other issues, in addition to funding problems, that are compounded to render the classical, single-purpose, one-dimensional institutions inadequately effective in their missions. Vocational schools, colleges and universities are devoted to providing educations in increasingly narrower, and highly specialized, fields. The child or young adult may emerge from all of these classical educational institutions with missed opportunities for learning, assimilating and understanding many important aspects of the world they inhabit. Likewise, as our world changes, adults have limited opportunities for certain forms of education, especially in participation with their children as a family affair. Also, fewer students are pursuing careers in science and engineering.

The economies of small and large communities alike today are being threatened by internal and external forces heretofore nonexistent. The conditions for small business incubation and growth are being destroyed by many factors acting in concert to threaten the foundations of America. The internal thresholds of bonds, permits, liability, insurance, environmental, legal, taxation, financial, and other barriers, including the internal expertise and number of startup employees required, to name only a few, have exceeded the feasibility for small business creation, much less survival. In addition, the economic sap is being drained by foreign or world-wide corporations mining the manufacturing plants, technologies, jobs and even money as profits, to foreign bases. Furthermore, the small hardware, grocery, drug store and other small businesses of a distributed nature historically providing great stability and security to communities are being eliminated due to the above named reasons, and due to mergers and single, super-stores with world-wide markets, competitive and monopolistic advantages. With only one, or very few, all-in-one food, hardware, clothing and other necessity suppliers in the community, the economic stability, security, and independence of the entire community is threatened. Self-sufficiency has been eliminated. Even food gardens, and home-based food preservation and storage methods have disappeared, and been replaced by the local super grocery store that delivers food from around the world. Collectively, our national security and stability is thus being undermined and threatened, not by bombs and war, but by economics and lack of infrastructure industries for self-sufficiency, as our economies become more superficial and internal, service-industry based.

Environmental issues of air, land and water pollution are of major concerns in most communities and not only threaten our natural resources security, but burden the economies and place often unsurmountable constraints upon businesses and industries upon which the communities were founded and depend upon for their very existence. Coupled with these issues are additional permitting, legal, and numerous other constraints that further negatively impact all aspects of living within a community. Ecosystems and habitats within a watershed are still vital to our food chain, water resources, recreation, and many other aspects of life in our communities, including overall quality of life. Greater public awareness, knowledge and understanding, and participation in environmental and ecological issues in a holistic manner is needed.

Research of all types on the environment, ecosystems, economies, educational systems and other topics is routinely conducted by academic and government institutions, usually without any public participation, knowledge of it, or understanding of the results or implications. The institutions usually are not "public friendly", engaging, or receptive to the general public and the results of their activities are usually published in some esoteric journal and filed in some archive of remote public access.

These specific issues, along with many others, have numerous things in common. In fact, they are coupled together, or interdependent in a large number of very significant ways. Yet, our country's structure and method or means of dealing with these issues is largely of a single, one-dimensional institutional approach, using narrowly focused and single mission institutions of education and government. As is well known in engineering, when only one variable is independently adjusted at a time, for a system that is governed by many interdependent variables that must be appropriately adjusted simultaneously and in harmony, a satisfactory solution is unattainable, and can in fact lead to system instability.

The issue is then, "What can be done to counter all of these negative forces and pressures simultaneously acting upon and within our cities and communities to achieve better solutions and results?" Thus, there is a further need for a method that simultaneously combines the issues of education, economic development, ecosystem activities, environmental issues, research activities, and recreational and entertainment activities of a community, and the interdependency of these issues in the design, profiling, evaluation, and configuration of a community facility.

SUMMARY OF INVENTION

The Watershed Museum and Activity Center (WMAC) method and process is a quantitative, interlaced, simultaneous, multi-disciplinary, systems engineering approach to improve and maximize achievement of goals and processes occurring within a city or greater extended community, such as, a large watershed area. The WMAC method serves as: 1) a catalyst, 2) an example of a methodology, and 3) a tool for improving the fundamental processes vital to a community. The WMAC method involves a specifically designed facility, a computer-based mathematical model, and an exemplary methodology for public participation and is applied at the grass roots level in communities. The variables chosen for illustration are because they usually represent the primary, strong, or first-order priority processes taking place within communities. The WMAC method chooses certain variables, or processes, and utilizes their interdependency, symbiotic and synergistic characteristics and relationships to enhance each process individually and the totality of effectiveness of all processes including financial solvency of the WMAC. The variables chosen here for illustrative purposes are education-learning ($w_1$), economic development ($w_2$), ecological preservation ($w_3$), environmental issues ($w_4$), research ($w_5$), entertainment and recreation ($w_6$). The WMAC method or process is applied and implemented through a multipurpose, multidisciplinary, specifically-designed facility or institution that provides the accommodations essential for each of the chosen variables, and more particularly is situated adjacent to a body of water, preferably a stream, or river. The WMAC method is a unique combination of activities, facilities, goals, and benefits to a community. Unlike other educational, research, and government institutions, the WMAC is a totally public-friendly, family activity center that entices all age ranges from 10 years old to the 90's to visit, explore, learn, recreate, entertain and actively participate together as families, mentors, or 4-12 science teachers and students, or university or government researchers acting individually or in partnerships. WMAC is an acronym for Watershed Museum and Activity Center. All research activities and results are described in the museum for general public consumption and data are presented using computer graphics and data animation for general public interest.

DETAILED DESCRIPTION OF THE PREFERRED EMBODIMENTS

The WMAC method utilizes not only the interdependent variable coupling coefficients to develop an enhanced system through which greater success is achieved, but also, the interrelationships among the chosen variables are exploited to generate many additional benefits to the community. For example, water quality and flow measurement is done for teaching science, creating data that can be computer graphically displayed and animated for easy public interpretation and for entertainment, as a necessary part of one of the economic development projects in aquaculture, and in support of ecosystem research. Since the stream or river water quality is being monitored continuously, it also serves as a local or national security measure against terrorism, and as an advance flood warning system, and in conjunction with the WMAC weather station supports development of watershed flood models. As another example, the combinations of economic development activities are chosen to provide a self-sufficient economic basis for the WMAC while serving as small business incubators for the community. Thus, the WMAC model and method generates many coupled byproducts that accrue to the community through the interrelationships of the particular variables chosen. All possible interrelationships are explored in the WMAC model. The WMAC collection of processes incorporated in the institution or multipurpose facility situated along and connected to or extending into the body of water via an aquarium creates a critical mass level of attraction for the community that will attract visitors and regular participants from great distances. Another role, among 50 or more, of the WMAC is to demonstrate the relationships among science, art, crafts, engineering and technologies.

In a mathematical sense, the WMAC method or process is a systems approach to maximizing or optimizing individually and collectively the chosen variables that represent individual processes, and wherein the sum or collective effectiveness is greater than the sum of the individually maximized effectiveness of each individual process due to catalytic and synergistic interactions among the individual processes. This can be visualized as adding to each variable, components from other interdependent variables. Each individual process, or variable, is also in general, a functional with tens, or even hundreds, of components, (that may likewise be coupled to other variable components) that can be summed in a vectorial manner. The process can also be represented graphically as the summation or resultant of force vectors acting upon each process about or through some axis of focus. The WMAC process is further illustrated, analyzed and designed through the use of the WMAC mathematical model or sets of general simultaneous equations (of algebraic, differential or difference, integral, or variational type) subject to constraints, wherein coupling coefficients are defined that relate the interdependence of the coupled individual variables or processes. The coupling coefficients will vary within each city or watershed setting. Since the sets of equations may not have exact solutions, numerical relaxation or similar methods may be used for approximate solutions or desired results. Computer graphics illustrations of each variable's components can be generated to create a unique pattern for each community showing strengths and weaknesses. Interactive animations of the model can be used for illustration, analysis, or design purposes such that community planners, architects or engineers can customize the model and facility for specific community needs or other specifically desired results. The WMAC model is itself an evolving process that is initially customized, and in a dynamic sense, continuously molded to address the specific needs of a community. The WMAC model variables chosen above for illustrative purposes that represent community processes and goals are briefly described below.

Education and Learning ($w_1$): The processes through which members of a community can learn, and the total average educational level members of a community achieve depend greatly upon opportunities. Included among the WMAC's many roles is a learning center, where complimentary, supplementary, extracurricular, and educational enrichment programs are offered to stimulate youth to pursue careers in science or engineering and, along with adults, continue to learn about the world they inhabit. In the WMAC model, the $w_1$ process variable is an equation representing the summation of specific WMAC and community educational activities, the components resulting from relationships with other community conventional educational programs, and the contributions of components from other variables that have interdependent relationships with the education and learning processes, such as research, ecosystem preservation, or even tourism incorporated and interlaced in the WMAC model. The WMAC model itself is used as an educational tool to teach citizens about the interrelationships of community goals, processes, and lifestyle habits.

Economic Development ($w_2$): Economic, and especially small business development, is becoming more of a tenuous issue in U.S. communities, and because of combinatorial and compounded effects of many regulatory, legal, insurance, world-wide corporation competition and marketing, and other constraints, the thresholds are too high for startup, much less, survival. In the process arts, crafts, skills, manufacturing technologies, etc., are being lost forever, and the small distributed businesses essential for stability of the country as a nation are disappearing. The WMAC facility is designed to play multiple roles in economic development within a community. In the WMAC model, the $w_2$ variable includes basic local resources and their uses in restoring local small businesses in food, arts, crafts and technologies with the incubated small businesses serving as teaching tools and cash flow for the WMAC. The $w_2$ equation is a summation of economic development activities, such as aquaculture, tourism, networking, restaurant, etc. within the WMAC and the community, as well as, components from other variables related to economic development such as training seminars. The WMAC itself serves as an economic development teaching tool and example.

Ecosystem preservation ($w_3$): The $w_3$ process variable is focused on the major variables influencing the habitats and species that play major roles in the local watershed food chain, and what roles they play in the ecosystem and the food chain. Ultimately, every known macro and micro specie of the local ecosystem is to be named, identified, characterized pictorially, poetically, graphically, artistically, sculpturally, by computer graphics and computer simulation, along with it's roles in the total ecosystem, including roles in the food chain, recreation, tourism, and local economy. All of this including some interactive computer versions, live and preserved species are exhibited within the WMAC museum. Subsequently, total local ecosystem simulation models generated from the long term research projects are to be constructed and installed in the computers in the WMAC museum, and available for general public observation and use. The $w_3$ variable is an equation representing the summation of ecosystem preservation related projects, and the components from other interdependent variables both within the WMAC and the community.

Environmental Issues ($w_4$): The $w_4$ variable is becoming a more important one in all aspects of every community involving the local economy, tourism, research, education and many other community processes. The $w_4$ variable is represented by an equation which is the summation of all local positive and negative environmental issues and projects and the components derived from other chosen variables both within the WMAC and the community.

Research ($w_4$): Research conducted within and about a community says a lot about the community. Research on ecosystems, environment, education, economic development and other topics can be instrumental toward helping a community achieve a multitude of goals and improve it's most important processes. The WMAC model variable $w_5$ includes research conducted through the WMAC and throughout a community, and is represented by the $w_5$ equation, which is a summation of local research activities and components of other variables influencing local research activities.

Entertainment and Recreation ($w_6$): Many large successful businesses originally started out as hobbies or personal entertainment or recreational activities. $W_6$ is included in the WMAC model because of the interdependent relationships with other WMAC variables and byproducts of many of the educational, research, small business and other activities of the WMAC. The $W_6$ equation is a summation of the entertainment and recreational activities in the WMAC and the community, and the components from other related variables. Rivers offer huge undeveloped potential for "ecosystem friendly" entertainment and recreation, and related economic development, educational, and research activities. It is through all of these simultaneous, synergistic activities that the community learns, assimilates, develops, and is uplifted, as if by a Tchaikovsky or Mozart crescendo.

The WMAC Facility

In addition to the facilities and accommodations of the specifically designed building to support the activities associated with the unique combination of variables $w_1$ through $w_6$, the WMAC facility includes a museum, restaurant (for serving small business e.g. aquaculture products), typically 15 rooms for in-resident artists or researchers, hobby and instrumentation shops, coffee shop, lounge, WMAC products sales shop, conference rooms, and aquariums, one interfaced with the stream and river for natural habitat and ecosystem studies, public observation, and general public and tourist activity participation.

The WMAC Model

The WMAC model can be formulated, expressed and illustrated in a variety of ways, including the following mathematical expressions:

$W_1 = \Sigma a_j w_j = a_1 w_1 + a_2 w_2 + a_3 w_3 + a_4 w_4 + a_5 w_5 + a_6 w_6 = C_1$ for an individual W variable, and for the system of equations in this illustration of the WMAC model:

$$W_T = \sum a_{ij} w_j, \text{ where } i = 1, 2, 3, 4, 5; 6, \text{ and } j = 1, 2, 3, 4, 5, 6, \text{ or}$$

$$W_1 = a_{11} w_1 + a_{12} w_2 + a_{13} w_3 + a_{14} w_4 + a_{15} w_5 + a_{16} w_6 =$$

$C_1$ and $C$'s are arbitrarty constants.

$$W_2 = a_{21} w_1 + a_{22} w_2 + a_{23} w_3 + a_{24} w_4 + a_{25} w_5 + a_{26} w_6 = C_2$$

$$W_T = W_3 = a_{31} w_1 + a_{32} w_2 + a_{33} w_3 + a_{34} w_4 + a_{35} w_5 + a_{36} w_6 = C_3$$

$$W_4 = a_{41} w_1 + a_{42} w_2 + a_{43} w_3 + a_{44} w_4 + a_{45} w_5 + a_{46} w_6 = C_4$$

$$W_5 = a_{51} w_1 + a_{52} w_2 + a_{53} w_3 + a_{54} w_4 + a_{55} w_5 + a_{56} w_6 = C_5$$

$$W_6 = a_{61} w_1 + a_{62} w_2 + a_{63} w_3 + a_{64} w_4 + a_{65} w_5 + a_{66} w_6 = C_6$$

wherein, the $C_i$'s are arbitrary constants, and $a_{ij}$ are the generalized coupling coefficients of the square 6×6 matrix. In matrix notation, $[a_{ij}][w_j] = [C_i]$, where the expanded matrix $[a_{ij}]$ has significance in reflecting the characteristics of the community and/or the WMAC. The above system of equations can be written individually for the WMAC and the community respectively, as:

$W_T = [W_{WMAC}] + [W_C]$, or combined according to the laws of matrices.

However, for customizing, analysis, design, and illustration purposes it is constructive to express them individually.

In this simplest WMAC model for illustration purposes, the w's are simple first-order terms giving rise to a set of linear equations. However, in general, the individual w's can themselves be different functionals, differential, difference, integral, or variational quantities of nonlinear form. For visualization, computer graphics applications and other analysis purposes and uses in the WMAC pertaining to the WMAC or the community, in general the (m×n) coefficients (simplified to the $a_{ij}$, 6×6 matrix above) can also be associated with a set of unit vectors in an n-dimensional variable space. Interpretation utilizing the WMAC model is that the $a_{ij}$'s represent the magnitudes of forces and force components acting within and upon the community, or the WMAC, to enhance achieving the respective missions, goals and processes.

Model Formulation and Implementation

Consider a small city within a larger mostly rural watershed, typical of Appalachia and other parts of the US. Assume for simple illustration, the city has the typical one-dimensional institutions of schools, small hospital, super grocery, super hardware-building materials, perhaps a couple of small factories, some private clubs, YMCA, senior center, vocational or 2-year colleges, but no university, and not many extra amenities for it's citizens, such as recreational centers, zoos, art or science museums, symphony orchestra, etc. Assume it has no unusual peculiarities, except for that polluted, muddy river with tires, plastic bottles and other debris scattered in with the driftwood along the banks, evidencing waste and the typical modern U.S. culture. Even with this simplistic setting, considerable multidisciplinary research is needed within the community to sufficiently characterize it's features, resources, internal structure, and internal workings in order to evaluate the principal diagonal and non-principal diagonal coefficients for the city's WMAC model equations.

The implications of the research and characterizations for the city's WMAC model are far reaching into the city's features and functionality. Cities are happenings that occurred over maybe a few hundred years, and they grew and developed according to topography, natural resource locations, geometrical constraints, land ownership, industries, etc. As a result, they are usually not balanced in any way. This is not necessarily bad, in fact, the many aspects of a city can be interpreted as their unique personality, identity and beauty. However, all significant types of imbalances and influences upon the functioning of the community need to be taken into consideration.

In characterizing each of the WMAC variables for the community, Newton's laws of motion, statics, dynamics, and any other appropriate engineering principles can be applied. Forces, pressures, moment-arms, axes-of-action or influence, boundaries, geometric location of major activity centers (GPS), etc. are taken into consideration. In formulating the complementary WMAC model, such a goal as minimizing the arrival time to the WMAC from all points, which side of the river, etc. could be formulated as a variational problem, analogous to the brachistochrone, which is the curve or path of quickest descent under gravitational influence, or as other isoperimetric variational formulations. Such considerations permit the WMAC to balance, pull together, weave and intertwine desirable interrelationships, or optimize, based upon demographic, geometric, economic, educational, environmental, ecological, or other criteria where, balance for example, or other goals are established. The six variables chosen here represent a "critical mass" minimum of activities to achieve significant impact in a community.

The method of the present invention is shown below:

Step 1 in evaluating the coefficients is to conduct extensive research within the community. Now, for illustration, consider the principal diagonal $a_{ii}$'s. These are the coefficients of the chosen variables, $w_j$'s. Arbitrarily, each institution or facility is assigned a weighted value based upon it's perceived weight in the community and the above described process of characterization, which can be based upon annual budget or revenues or other criteria. The $a_{ii}$ coefficients for each $w_j$ variable can then be summed to yield the trace of the coefficient matrix of the facility, which can be called the trace of the community or the WMAC.

Step 2, likewise, the non-principal diagonals $a_{ij}$, where i≠j, are evaluated taking into account any relationships existing among the $w_j$ variables. In such a simplistic setting as described above, there is minimal, yet significant, interdependency or coupling among the institutions, businesses, schools, etc., when considered within groups, or across groups. The C's can be chosen to emphasize or reflect relevance of the particular variables, existing conditions, or goals of the community.

In Step 3 the WMAC model is then designed, based upon goals and what is appropriate for that city, after interpreting the resources, structure and inter-workings of the city. Likewise, the appropriate coefficients of the variables are determined. It is important to note that a WMAC is not intended or designed to compete with a city's businesses, rather, it is designed to complement, fill in voids, initiate, catalyze, and pull together the city's components. In reality, the sophistication of such WMAC models is endless, although at some point it becomes nonproductive due to the law of diminishing returns.

Step 4 includes inserting the coefficients into the equations and the matrices for analysis and interpretation. For example, the trace and determinant can be calculated, any other calculations performed such as solving the equations for $w_j$, and computer graphic illustrations can be displayed. Various visualizations and interpretations may then lead to iterations in the WMAC design. This can be facilitated mathematically, or graphically, using computer graphics or superposition.

Sample Model Application:

The following is a sample application of the method of the present invention:

Assume the coefficients evaluated for the example community described above for the equation

| | $[a_{ij}]$ | | | | | $[w_j]$ | = | $[C_i]$ | to be: |
|---|---|---|---|---|---|---|---|---|---|
| 12 | 2 | 1.5 | 4 | 0 | 2 | $w_1$ | | 70 | |
| 1 | 5 | 0 | 2 | 0 | 3 | $w_2$ | | 10 | |
| 0 | 0 | 1 | 1 | 1 | 4 | $w_3$ | = | 2 | |
| 3 | 2 | 2 | 6 | 3 | 0 | $w_4$ | | 7 | |
| 2 | 1 | 0 | 1 | 4 | 1 | $w_5$ | | 2 | |
| 2 | 0 | 1 | 0 | 3 | 1 | $w_6$ | | 9 | |

A variety of calculations can easily be made for these equations. The trace, which is the summation of the principal diagonals of the coefficient matrix, is 29. The determinant of $[a_{ij}]$ can be calculated as −4,872, and solving the equations for the w's yields:

$$w_1=5.8, w_2=1.3, w_3=3.7, w_4=-2.2, w_5=-2.3, w_6=0.7$$

Depending upon the nature of the w's it may be meaningful to calculate eigenvalues, eigenvectors, or other mathematically derived quantities.

Likewise for the WMAC, the equations may be represented by:

$$[a_{ij}][w_i]=[C_i]$$

with appropriate complementary coefficient matrices reflecting goals of the WMAC of:

$$\begin{bmatrix} 4 & 3 & 2 & 4 & 2 & 1 \\ 6 & 5 & 1 & 3 & 3 & 6 \\ 3 & 2 & 3 & 4 & 1 & 2 \\ 2 & 3 & 3 & 2 & 4 & 3 \\ 2 & 4 & 5 & 6 & 8 & 2 \\ 1 & 4 & 2 & 2 & 2 & 7 \end{bmatrix} \begin{matrix} w_1 \\ w_2 \\ w_3 \\ w_4 \\ w_5 \\ w_6 \end{matrix} = \begin{matrix} 10 \\ 20 \\ 20 \\ 15 \\ 25 \\ 10 \end{matrix}$$

Again, a variety of calculations can be made for these equations. The trace, for this coefficient matrix is also 29. The determinant of $[a_{ij}]$ can be calculated as 1,166, and solving the equations for the w's yields:

$$w_1=4.5, w_2=-10.56, w_3=2.4, w_4=1.99, w_5=3.12, w_6=4.67$$

For illustration, where $W_T=[W_{WMAC}]+[W_{Community}]$ $$W_T = \begin{bmatrix} 16 & 5 & 3.5 & 8 & 2 & 3 \\ 7 & 10 & 1 & 5 & 3 & 9 \\ 3 & 2 & 4 & 5 & 2 & 6 \\ 5 & 5 & 5 & 8 & 7 & 3 \\ 4 & 5 & 5 & 7 & 12 & 3 \\ 3 & 4 & 3 & 2 & 5 & 8 \end{bmatrix} \begin{matrix} w_1 \\ w_2 \\ w_3 \\ w_4 \\ w_5 \\ w_6 \end{matrix} = \begin{matrix} 80 \\ 30 \\ 22 \\ 22 \\ 27 \\ 19 \end{matrix}$$

where upon the trace is 58, the determinant of $[a_{ij}]$ is −23,775 and the equations solved for the w's yield:

$$w_1=5.46, w_2=-6.97, w_3=-8.98, w_4=5.10, w_5=3.11, w_6=3.96$$

Thus, applying these results to the profiling, evaluation and design of a community facility, it can be determined what features are needed, what features are to be stressed, and what features can be reduced, in order to best fit the needs of the community and to improve the community. For example, using the above results, the community facility in this example needs to prioritize its activities in the following order from strongest (or most emphasized or most needed activity in the community) to weakest (least emphasized or least needed activity in the community): (1) educational activities, $w_1$, (2) economic development activities, $w_2$, (3) research activities, $w_5$, (4) ecosystem preservation, $w_3$, and environmental activities, $w_4$, and (5) entertainment and recreational activities, $w_6$.

Taking these results to the next step, a community facility having about 55,500 square feet may be designed with the following features which takes into account features that correspond to the above coefficients:

1. Museum and Science Center
   a. Local watershed and archeological artifacts (5000 sqft)
   b. Local live and mounted species (5000 sqft)
   c. High tech science with local applications (5000 sqft)
   d. Local watershed aquatic arts, crafts, products (5000 sqft)
2. Restaurant (4000 sqft)
   a. 100 seating capacity to accommodate tour buses and other regular customers simultaneously
   b. Local watershed cuisine featuring local aquaculture products
3. Coffee shop (1500 sqft)
   a. Riverside deck for outside seating
   b. Counter for short order foods—open when building is open
   c. Vending machines—always accessible when building is open
4. Lounge (2000 sqft)
   a. Adjacent to coffee shop with first floor entrance
   b. Computers, projectors and big screens
   c. Windows that overlook river
5. Gift Shop (500 sqft)
   a. Clothes, jewelry, specialty items and literature on WMAC
6. Misc. Booths (300 sqft)
   a. Reception, information, tour guide, admission, security booths, building communications center, and computer center
   b. All located on first floor
7. Rooms to Rent (4500 sqft)
   a. Motel style efficiency rooms—about 14.
8. River based aquarium and ecosystem (3000 sqft)
9. Research laboratory and craft shop (5000 sqft)
10. Meeting rooms and large conference room (4000 sqft)
11. Conference, exhibits and display center (4500 sqft)
    a. Sporting goods and boat shows
    b. Traveling exhibits—fishing, etc.
    c. Permanent exhibits—locks/dams, white water rapids, etc.
    d. Small business local watershed aquatic products exhibits
12. Facility offices (3500 sqft)
    a. Administrative, development, procurement, etc.
13. Boat dock for river visitors—about 12 slips or about 200' water front
14. Bathrooms (800 sqft), elevators (225 sqft), 2 stairwells (800 sqft), utilities (800 sqft)

Although the present invention is described in terms of designing, profiling, evaluation, and configuring a community center, it is readily apparent that one of ordinary skill in the relevant art can apply the methodology described herein to design, profile, evaluate, and construct any public facility, including, but not limited to, a church, rehabilitation center, public service center, government building, and school. Such process can also be applied to as a methodology to the general solution of interconnected or interdependent problems confronting a community subject to finite constraints, and involving for example the above-described or other variables.

CONCLUSION

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for simultaneously improving educational, economic, ecosystem, environmental, and research processes in concert within a community by creating a public facility for the community in proximity to a body of water, comprising the steps of:
  (a) calculating a total desired community profile variable representing the community's desired educational activities, economic development activities, ecosystem preservation activities, environmental issues and projects, research activities, and entertainment and recreational activities;
  (b) calculating a total desired facility profile variable representing a facility's desired educational activities, economic development activities, ecosystem preservation activities, environmental issues and projects, research activities, and entertainment and recreational activities;
  (c) generating a simultaneous summation of said total desired community profile variable and said total desired facility profile variable;
  (d) using said simultaneous summation to design, evaluate, profile, and configure a public facility for the community in proximity to a body of water; and
  (e) constructing said public facility for the community in proximity to a body of water; wherein said steps (a) through (d) are carried out by use of a computer system.

2. The method according to claim 1, wherein said public facility is selected from a group consisting of a community center, church, rehabilitation center, public service center, government building, and school.

3. A public facility located in proximity to a body of water as created by the method of claim 1.

4. The system according to claim 1, wherein said means for evaluating a plurality of coefficients for the community, said means for evaluating a plurality of coefficients for a facility, said means for summing said coefficients for the community with said coefficients for said facility, said means for evaluating one or more interdependencies between said coefficients for the community and said coefficients for said facility, and said means for designing a public facility for the community according to said summation and said one or more interdependencies comprise a computer system.

\* \* \* \* \*